United States Patent [19]

Kajander

[11] Patent Number: 5,840,413
[45] Date of Patent: Nov. 24, 1998

[54] FIRE RETARDANT NONWOVEN MAT AND METHOD OF MAKING

[75] Inventor: Richard Emil Kajander, Toledo, Ohio

[73] Assignee: Johns Manville International, Inc., Denver, Colo.

[21] Appl. No.: 890,725

[22] Filed: Jul. 9, 1997

Related U.S. Application Data

[63] Continuation of Ser. No. 310,958, Sep. 23, 1994, abandoned, which is a continuation-in-part of Ser. No. 91,096, Jul. 13, 1993, abandoned.

[51] Int. Cl.⁶ .................................................. B32B 27/42
[52] U.S. Cl. .................................... 428/292.1; 428/297.4; 428/299.4; 428/317.1; 428/317.7
[58] Field of Search .............................. 428/292.1, 297.4, 428/299.4, 317.1, 317.7

[56] References Cited

FOREIGN PATENT DOCUMENTS 0476644  3/1992  European Pat. Off. .

OTHER PUBLICATIONS

Goetze et al., "New developments in technical melamine-formaldehyde resins", Kunstharz–Nachr, v. 20, pp. 16–20 (1983).

Saunders, "Organic Polymer Chemistry" pp. 349–355 Chapman & Hall Second Edition, 1988.

Yoshinaga, CA # 115:209844, Jul. 5, 1991.

Brintzinger, "Nonflammable Laminates", (Aug. 6, 1970) CA #73:111184.

Brintzinger, "Noncombustible Paper", (Jul. 23, 1970) CA #75:7672.

Syncoglas, "Nonwoven Fabric", (Mar. 24, 1971) CA #75:22445.

Kamutzki, "Low–formaldehyde melamine resins for paper", (1989), CA #111:235385.

*Primary Examiner*—Cecilia J. Tsang
*Assistant Examiner*—Patrick R. Delaney
*Attorney, Agent, or Firm*—Robert D. Touslee

[57] ABSTRACT

Described is a fiber glass mat composition comprising a fiber glass matrix bonded with fire retardant melamine resin binder composition capable of forming a nonwoven mat having at least 27% by weight nitrogen (N) in the dry, bur uncured resin. Also described is a method of making a fire retardant nonwoven fiber glass mat comprising the steps of providing an aqueous melamine based resin binder; applying the binder to fiber glass; and recovering a fire retardant fiber glass mat, wherein the mat has at least 27% by weight N in the dry, but uncured resin wherein the ratio of resin in the mat to N content of the resin does not exceed about 0.6.

7 Claims, No Drawings

FIRE RETARDANT NONWOVEN MAT AND METHOD OF MAKING

This patent application is a continuation of application Ser. No. 08/310,958, filed Sep. 23, 1994, since abandoned, which application was a continuation-in-part of application serial no. 08/091,096 filed Jul. 13, 1993, since abandoned, and entitled FIBER GLASS FIRE RETARDANT NONWOVEN MAT AND METHOD OF PREPARING SAME.

TECHNICAL FIELD

This invention pertains to fire retardant fiber glass nonwoven mats.

BACKGROUND

Fiber glass mat is made in many weights and sizes and can be used for a variety of applications. A general discussion of glass fiber technology is provided in "Fiber Glass" by J. Gilbert Mohr and William P. Row, Van Nostrand, Reinhold Co., New York 1978, which is hereby incorporated by reference. Fiber glass mats of the nonwoven type are generally known.

U.S. Pat. No. 4,145,371 by Tohyama et al discloses a flame-retardant textile fiber consisting of PVA and an amino resin. The amino resin is a condensation product of formaldehyde with melamine and other amino compounds selected from urea, dicyandiamide and benzogranamine. The use of phosphorous additives is suggested to enhance the flame-retardant characteristics of the fiber. The addition of dicyandiamide was found to improve the color fastness of the fiber.

It is known to use relatively large amounts of a phosphorus containing compound to produce a fire retardant condensate as taught by Goulding et al in U.S. Pat. No. 4,159,139. There a melamine-aldehyde is reacted with a relatively large amount of at least one oxyacid of phosphorous in a condensation reaction to form the fire retardant, the inorganic phosphorus compound being added in sufficient amounts that phosphorous is present in the resulting condensation product in the ratio of 0.4–1.7 moles of phosphorus for every mole of melamine.

U.S. Pat. Nos. 4,560,612 and 4,609,709 assigned to Owens-Corning Fiberglas relate to a binder composition containing a urea-formaldehyde resin, a styrene-butadine latex copolymer and a fully methylated melamine-formaldehyde resin. The binder is applied to glass fiber mats used in the production of roofing felts. The utilization of a fully methylated resin provides improved moisture resistance over prior art binders.

U.S. Pat. No. 4,183,832 by Munier et la teaches a method of preparing a melamine formaldehyde resin that has an improved shelf-life and a low free formaldehyde content. The resin is used to increase the tensile strength and suppleness of 100% glass fiber mats.

U.S. Pat. No. 4,960,826 assigned to Borden, Inc. discloses melamine-containing resole, resitol and resite compositions containing at least one phenolic compound, at least one aldehyde compound and at least one free melamine. The compositions are primarily used in applications where hard binders are required, as in engineered, shaped or molded glass fiber containing fabricated parts, e.g. using that invention, C-stage products can be resistant to punking or thermal shock.

In the manufacture of wet laid nonwoven mats containing a large proportion of glass fibers, typically used binders such as urea-formaldehyde resins or polyvinyl acetate, styrene butadiene rubber and acrylic copolymer latexes, will burn. Even polyvinyl chloride resin systems, if not high enough in chloride, will burn and may emit hydrogen chloride and heavy smoke.

It is an object of the present invention to make nonwoven fiber glass fire retardant mats that contain a binder with a very high nitrogen content which increases the fire retardancy of the mat.

It is also an object of the present invention to make fire retardant fiber glass nonwoven mats that do not require or contain additional flame retardants such as phosphates, other than catalytic amounts of phosphorus compounds, ammonium compounds, aluminum compounds or chlorinated compounds whether inorganic or organic.

SUMMARY OF THE INVENTION

Described herein are fiber glass mats and papers comprising a nonwoven glass fiber matrix bonded together with a fire retardant melamine resin binder composition having at least about 27% by weight nitrogen (N) in the dried, but uncured resin and wherein the mat or paper has no more than a catalytic amount of any phosphorus compound present, a catalytic amount being generally less than 1.5 wt percent of the resin, the ratio of resin binder in the mat or paper not exceeding about 0.6 of the N content. Also described is a method of improving the fire retardancy of a nonwoven fiber glass mat comprising the steps of providing an aqueous melamine based resin binder; applying the binder to nonwoven fiber glass mat, wherein the mat has more than about 27% by weight of (N) in the dried, but uncured resin binder and wherein the ratio or percentage of resin in the finished mat or paper does not exceed about 0.6 of the N content of the resin, any phosphorous compounds present do not exceed catalytic amounts which normally are less than about 1.5% by weight of the melamine resin. Further embodiments of the invention include modification of the above mat compositions wherein up to 20% of the melamine based resin is replaced with urea formaldehyde resin binder and mats with binders containing pigments, like carbon black, in amounts up to 25% based on the weight of the resin binder, so long as any phosphorous compounds present do not exceed catalytic amounts as described above.

The preferred mats of the present invention contain 60–90 weight percent of glass fibers, 10–30 weight percent of melamine based binder, and up to 15 weight percent of organic fibers, based on the weight of the finished mat. The preferred nitrogen content of the melamine resin used in the present invention is at least 35 percent with at least 40 percent being better and at least 45 percent being the most preferred for flame resistance, based on the uncured resin after essentially all of the solvents have been removed.

DETAILED DESCRIPTION OF THE INVENTION

Melamine formaldehyde resins are well known resinous materials. The composition of melamine formaldehyde resins and the various reaction mechanisms of the resins have been described in available literature. One reference entitled "Reaction Mechanism Melamine Resins" by Werner J. Blank, JOURNAL OF COATINGS TECHNOLOGY, Vol. 51, n.656, Sept. 1979. pp. 61–70, discusses alkylated amino formaldehyde resins, which is hereby incorporated by reference.

The glass fibers which can be used to make mats can have various fiber diameters and lengths dependent on the strength and other properties desired in the mat as is well known. It is preferred to use glass fibers having diameters in the range of 3 to 20 microns, most preferably 10 to 14 microns. Normally the glass fibers used all have about the same length, such as 0.75±0.08 inch, but fibers of different lengths and diameters can also be used to get different characteristics in a known manner. Fibers up to about 3 inches in length can be used in a wet process for making fiber glass mats. Generally the longer the fiber, the higher the tensile and strengths of the mat, but the poorer the fiber dispersion. A process for making nonwoven fiber glass mats is described in U.S. Pat. No. 4,112,174, which reference is hereby incorporated by reference. Any known method of making nonwoven mats can be used.

The preferred technique for the making of mats of the present invention is forming a dilute aqueous slurry of fibers and depositing the slurry on to a moving screen forming wire to dewater the slurry and form a wet nonwoven fibrous mat, transferring the wet, unbonded mat to a second moving screen running through a binder application saturating station where the melamine resin based binder, usually in aqueous solution, is applied to the mat, removing excess binder, and drying the unbonded, wet mat and curing (polymerizing) the melamine based resin binder bonding the fibers together in the mat. Preferably, the aqueous binder solution is applied using a curtain coater or a dip and squeeze applicator. In the drying and curing oven the mat is subjected to temperatures of 250–450 or 500 degrees F. for periods not exceeding 4 or 5 minutes. Alternative forming methods include the use of well known cylinder forming and "dry laying".

It has been discovered that melamine formaldehyde resins containing at least about 27% by weight nitrogen in the dry, but uncured, resin are resistant to a vertically climbing flame when used as the binder in fibrous glass mats. Such resin binders with such high nitrogen contents do not require conventional flame retardants like antimony trioxide, organic phosphates, phosphorous compounds, aluminum trihydrate, ammonium chloride, chlorinated oils and paraffins, etc. While a minimum of about 27% nitrogen content in the dry, but uncured, melamine formaldehyde resin is critical to the invention, resins having at least 29% perform better, resins having at least 35% are preferred and those with at least 40% are most preferred for flame resistance. These percentages are based on the uncured resin after essentially all of the solvents have been removed.

Fibrous glass papers or mats, or papers and mats containing a mixture of glass fiber and other fibers, when made using the particular kinds of melamine formaldehyde resins, with or without up to 20% urea, described above and when used in critical amounts are not only strong flexible and tough, but are also fire retardant or non-burning. It has been discovered that the nitrogen content in the raw, relatively unpolymerized melamine formaldehyde resin along with the ratio of resin content in the mat divided by this nitrogen content in the dry, but uncured resin is critical to achieving the fire retardancy characteristics in the mat or paper products. The percent of nitrogen in the raw resin is usually achieved by controlling the ratio of formaldehyde to melamine, which can theoretically range from six-to-one down to one-to-one. This provides a corresponding nitrogen content (on a solid resin basis) of approximately 27–70% by weight. These resins are frequently etherified with alkanols, such as one-to-four carbon atoms, preferably methanol or ethanol, to improve water solubility. Ratios of two-to-one to one-to-one (formaldehyde to melamine) resins are historically poor for water solubility. Etherification generally improves solubility in water.

The resins used in the present invention can contain catalytic amounts of a catalyst to speed curing or polymerization at elevated temperatures. However, more than catalytic amounts of most catalysts, such as phosphorus compounds, cannot be used because it would cause premature polymerization of the resin in storage or in the mat process prior to drying which would destroy the fiber bonding capability essential for the resin binder. For this reason, no more than 1.5 weight percent, based on the weight of the resin, of a phosphorus compound, such as a buffered phosphate, can be present in the aqueous resin solutions used in this invention.

The preferred mat compositions of the present invention are described in Table 1 below. The percentages in Table 1 are based on the total weight of the finished mat.

TABLE 1

| Ingredient | Weight Percent | Preferred Wt. Percent |
|---|---|---|
| Melamine based binder | 5–50 | 10–30 |
| Glass fibers | 10–95 | 60–90 |
| Organic fibers | 0–50 | 0–15 |

The melamine based binder can also contain up to 25% by weight of the melamine based binder, of a modifier like ethylene vinyl chloride or a PVC latex to make the mat more flexible and to bond in pigments like carbon black in amounts up to about 25%, based on the weight of the resin binder. Also, up to 20% of the melamine based resin binder can be replaced with urea formaldehyde. Within these modification limits the finished mats will retain the good fire retardancy and other properties.

Organic fibers for the aforementioned composition is meant to include natural, thermoplastic, thermoset or miscellaneous fibers. By nature is meant wood, cotton, cellulose derivatives such as rayon or acetate fibers. By thermoplastic is meant polyester, polyamide, olefinic, polyimides, etc. Thermosets may be phenolic, polyester, etc. Carbon fiber is an example of a miscellaneous fiber.

Preferably, the binder is a melamine formaldehyde condensate polymer commercially available. This binder can be used with or without additional additives. Additives such as pigments, defoamers, catalysts, plasticizers and processing aids, within the limitations defined herein, can be used. The melamine formaldehyde polymer may also be "fortified" with nitrogen containing compounds such as urea, melamine, dicyandiamide and guanidine.

After application of the binder to the mat of glass fibers, the mat is then dried and cured to at least a B-stage product. By this is meant that the glass fiber composition has almost all of the water removed from the binder. The B-stage cured mat can be later hot molded into a desired shape, usually after laminating with B-staged fiber glass wool insulation in a known manner, and the resin fully cured to retain the compressed shape. Such mats are useful in molding products such as automotive hoodliners, dash insulators, etc.

Preferably the mat is fully dried and the binder is fully cured. The curing of the glass fiber mat with a binder applied thereto as described herein is generally very quick depending upon the temperature and time treatment. Generally, the temperature ranges from about 300 to about 500 degrees F. with a period of time at that temperature of less than 5 minutes, preferably from about 10 seconds to 2 minutes, and most preferably from about 1 to 10 seconds.

When using the B-staged mat to make a laminate such as automotive headliners or hoodliners, a curing time of less than 90 seconds is preferred. Presently automotive headliners and hoodliners require elevated molding temperatures to have cure cycle times competitive to non-fiber glass products. The inventive composition provides the same cure cycle process time with much lower molding temperatures. For example, a hoodliner made using prior art mats bound with standard thermoset resins will have a cure cycle time of 20 seconds when mold temperatures are 650 degrees F. This high temperature is too high for aluminum molds requiring much more expensive steel molds. When using the B-staged mat of the present invention, mold temperatures can be reduced to 425 degrees F. allowing the use of aluminum tools.

In Example 1 below are described typical products of the present invention. All percentages are by weight unless otherwise stated.

EXAMPLE 1

A. A mat having a basis weight of 6.8 grams per square foot (gsf) containing 18% binder, 4% fine glass fiber with diameters of less than 5 microns, 7% polyester fiber of 3 denier and 0.5 inch length, and 71% of 13 micron glass fiber of 0.75 inch length was made on a wet mat machine The binder was Astromel CR-1, trademark of the Borden Chemical Company. This binder is an aqueous solution of melamine formaldehyde having a solids content of about 80%, a pH of 9.0±0.5 and containing 31–32% nitrogen, based on the weight of the dry, uncured resin. This resin was catalyzed with about 1±0.5% of a buffered phosphate catalyst, usually about 0.5% in a known manner. Other catalysts can be used to accelerate the cure as is well known in the art of making resin binders for bonding fiber glass mats in known wet mat processes. After the mat was formed and the binder solution was applied, the mat was dried and cured at 370 degrees F. in an impingement drier with the mat traveling at about 400–600 feet per minute. The curing time was only a few seconds. The resultant mat did not support a vertical flame in a flame test described in Example 2 below.

B. A 9.0 gsf nonwoven fiber glass mat containing 18% binder and 82% 0.75 inch long 13 micron glass fibers, with the binder being Astromel CR-1, with a pH of about 9 and catalyzed as described in Example 1, was dried and cured by heating briefly to 370 degrees F. The resultant mat does not support a vertical flame.

C. A 13.6 gsf nonwoven fiber glass mat containing 45% binder and 55% 0.5 inch long 10 micron glass fiber was made in a similar manner, but an uncatalyzed Astromel CR-1 binder was used and the bindered mat was dried to a "B" stage (not fully cured) at 300 degrees F. to make a mat that can be remolded at 425 degrees F. to shape the mat and fully cure the binder. The molded and cured mat would not support a vertical flame.

EXAMPLE 2

For this example the composition described in Example 1, B, was made into mats using three different resins and the resultant mats were tested as follows.

| Resin | Melamine:Formaldehyde Ratio | % N in Resin* | Flame Test Vertical Climb |
|---|---|---|---|
| Aerotex 3730 | 1:6 | 26–27 | Failed-climbing flame |
| Aerotex MW | 1:4 | 35 | Passed-flame snuffs out |
| Aerotex MS | 1:3 | 41–42 | Passed-will not flame |

*Determined by Kjeldahl nitrogen.

Aerotex is the trademark of American Cyanamid Company for a family of melamine formaldehyde binders. Mats were made using each of these binders in place of Astromel CR-1 using the same technique used in Example 1, B, and tested in the vertical flame test.

The vertical climb flame test employs a three inch by five inch mat sample. A wide mouth Bunsen burner is placed at the three inch base of the sample approximately 0.5 inch below the sample with a flame height of about 1.5 inch.

The test results shown above show the criticality of the nitrogen content of the binder resin to the flame retardancy. The higher the nitrogen content above 27% in the resin, the greater the ability of the mat to retard flame.

EXAMPLE 3

Further testing of compositions similar to that described in Example 1 (B) above, except for the resin content in the finished mat showed the following:

| Resin | % Resin in Mat | Flame Test (Vertical Climb) |
|---|---|---|
| Aerotex 3730 | 17 | Failed (climbing flame) |
| Aerotex 3730 | 25 | Failed (climbing flame) |
| Aerotex MW | 21 | Passed (flame snuffed out) |
| Aerotex MW | 25 | Failed (climbing flame) |
| Aerotex MS | 19 | Passed (wouldn't flame) |
| Aerotex MS | 25 | Passed (flame snuffed out) |

This test data shows that the ratio of resin in the mat to the N content in the dry but uncured resin should not exceed about 0.6.

Testing of even high %N containing resins shown diminished smoke generation when burned (either pass the previously described flame test or show less of a flame time when subjected to 700 degrees C., or both). The %N is dictated by the melamine to formaldehyde ratio during the resin manufacturing and further influenced by the amount and type of etherification and pre condensation. Resins having a melamine to formaldehyde ratio from about 1:6 to 1:1 are preferred and a ratio of 1:3 to 1:1 are most preferred.

The following information shows additional fire test results of two mat embodiments of the present invention made with binder resins D and E. Binder resin D is Astromel CR-1, a trademark of Astro Industries, a division of Border, Inc. for a low formaldehyde melamine resin, the binder used in Example 1 above. Resin E is Madurit VMW 3830, trademark of Hoechst AK of Frankfurt, Germany, for a non-plasticized methyl ethered melamine formaldehyde resin having a pH of about 10.

| Resin | % N | ASTM E662 NBS Smoke Chamber Smoke Density | ASTM E132 Flame Time (sec.) & Temp. rise during test | |
|---|---|---|---|---|
| D | 40 | 4.6 | 106 | 58° C. |
| E | 50 | 3.9 | 39 | 53° C. |

ASTM 662 detects smoke by the optical density (maximum reached) of smoke generated by vertically burning a specific size sample in a standardized, sealed enclosure. ASTM E132, run in a vertical tube furnace, detects flame time and temperature rise measured in the (750° C.) temperature controlled vertical muffle tube furnace. A specific size sample is observed for flammability/charring/ weight loss at this temperature as well as length of time to burn and the subsequent rise in temperature.

EXAMPLE 4

The melamine formaldehyde resins used in the present invention can be fortified with additional high nitrogen containing materials as shown below.

| Resin & Dicyanamide | % Resin in Mat | Flame Test - Vertical Climb |
| --- | --- | --- |
| Resin A* | 25 | Failed - climbing flame |
| 90% A + 10% Dicy. | 26 | Failed - climbing flame |
| 70% A + 30% Dicy. | 29 | Passed - would not flame |

*Resin was Aerotex 3730

As shown above, a greater increase in nitrogen content by adding Dicyanamide improves the flame test results. The flame test used was the same as described in Examples 1 and 2.

EXAMPLE 5

A preferred embodiment is a mat having a basis weight of about 1.5 lbs/100 sq. ft. made on a continuous wet process machine and having the following composition; 60 wt % 0.75 inch long K filament E glass fiber, 10% sodium borosilicate microfiber (minus 3 micron), 5% carbon black pigment and 5% polyester fiber (1.5 denier by 0.25 inch long) bound together with 20% of a binder made up of 13.5% melamine formaldehyde resin (Astromel CR-1™), about 0.5% amine buffered phosphoric acid catalyst and about 6% PVC latex (BF Goodrich Vycar™, homopolymer PVC). The PVC latex provides good bonding for the carbon black making it a good anti-rub agent, i.e. prevents the carbon black pigment from rubbing off of the mat.

While the forms of the invention herein disclosed constitute presently preferred embodiments, many others are possible. It is not intended herein to mention all of the possible equivalent forms or ramifications of the invention. It is understood that terms used herein are merely descriptive rather than limited, and that various changes obvious to one of ordinary skill in this technology may be made without departing from the spirit or scope of the invention.

I claim:

1. A fire resistant nonwoven fiber glass mat containing no additional flame retardants such as phosphates, other than catalytic amounts of phosphorous compounds, ammonium compounds, aluminum compounds or chlorinated organic or inorganic compounds, and comprising 60–90 weight percent of glass fibers bonded together with 10–30 weight percent of an aqueous melamine formaldehyde resin based binder, based on the weight of said mat, wherein said melamine formaldehyde resin has in a dry, but uncured, state a nitrogen content of at least 35 weight percent, wherein the percentage of resin in the final mat does not exceed 0.6 of said nitrogen content, and wherein the phosphorous content of said resin does not exceed an amount remaining from an initial maximum of 0–1.5 percent of a buffered phosphate catalyst in an aqueous melamine formaldehyde resin based binder.

2. The mat of claim 1 further containing up to 15 weight percent organic fibers.

3. The mat of claim 2 wherein said binder contains up to 20 percent, based on the weight of the melamine resin in the binder, of urea formaldehyde.

4. The mat of claim 1 wherein said nitrogen content is at least 40%.

5. The mat of claim 4 wherein said nitrogen content is at least 45%.

6. The mat of claim 4 wherein said binder contains up to 25 percent, based on the weight of said resin binder, of a coloring pigment like carbon black.

7. The mat of any one of claims 1–6 wherein said binder contains up to 25 percent, based on the weight of said resin binder, of a plasticizer including ethylene vinyl chloride or a polyvinyl chloride latex.

* * * * *